US007155330B2

(12) United States Patent
Dunsworth et al.

(10) Patent No.: US 7,155,330 B2
(45) Date of Patent: Dec. 26, 2006

(54) CAM SENSOR ELIMINATION IN COMPRESSION-IGNITION ENGINES

(75) Inventors: Vincent F. Dunsworth, Edinboro, PA (US); Shawn M. Gallagher, Erie, PA (US); James Robert Mischler, Girard, PA (US)

(73) Assignee: General Electric Company, Schenectady, NY (US)

(*) Notice: Subject to any disclaimer, the term of this patent is extended or adjusted under 35 U.S.C. 154(b) by 94 days.

(21) Appl. No.: 11/098,975

(22) Filed: Apr. 5, 2005

(65) Prior Publication Data

US 2005/0182554 A1 Aug. 18, 2005

Related U.S. Application Data

(63) Continuation of application No. 10/615,439, filed on Jul. 8, 2003, now Pat. No. 6,889,663.

(51) Int. Cl.
*B60T 7/12* (2006.01)
*F02M 51/00* (2006.01)

(52) U.S. Cl. ...................... 701/105; 701/113; 123/491; 123/501

(58) Field of Classification Search ................ 123/491, 123/480, 486, 501, 502, 179.16, 179.17; 701/113, 105
See application file for complete search history.

(56) References Cited

U.S. PATENT DOCUMENTS

| | | | |
|---|---|---|---|
| 4,027,641 | A | 6/1977 | Moder |
| 4,379,332 | A | 4/1983 | Busser et al. |
| 4,554,899 | A | 11/1985 | Engel et al. |
| 4,760,830 | A | 8/1988 | Bullis et al. |
| 5,146,900 | A | 9/1992 | Sekiya |
| 5,394,851 | A | 3/1995 | Cryer et al. |
| 5,425,340 | A | 6/1995 | Petitbon et al. |
| 5,577,892 | A | 11/1996 | Schittler et al. |
| 5,676,114 | A | 10/1997 | Tarr et al. |
| 5,758,625 | A | 6/1998 | Ponti |
| 5,819,704 | A | 10/1998 | Tarr et al. |
| 6,367,456 | B1 | 4/2002 | Barnes et al. |

(Continued)

FOREIGN PATENT DOCUMENTS

EP 0884375 A1 11/1995

(Continued)

*Primary Examiner*—John T. Kwon
(74) *Attorney, Agent, or Firm*—Carlos Hanze, Esq.; Enrique J. Mora, Esq.; Beusse Wolter Sanks Mora & Maire, P.A.

(57) ABSTRACT

A method for controlling start of a compression ignition engine having a plurality of cylinders is provided without a cam sensor is provided. Each cylinder includes a respective piston reciprocally movable between respective top and bottom positions along a cylinder longitudinal axis. The method comprises providing a respective fuel delivery assembly for each cylinder. In one embodiment the method further comprises retrieving from memory a set of fuel delivery assembly firing rules and then processing the firing rules so that a firing signal is delivered to each fuel delivery assembly on every crank revolution during a cranking mode of operation. The fuel delivery assembly is arranged to be responsive to any firing signal received during an injection window leading to the top position along the longitudinal axis so as to supply fuel to each cylinder during that injection window. The fuel delivery assembly is further arranged to be insensitive to any firing signal received during an exhaust stroke leading to the top position along said longitudinal axis so that no fuel is delivered to each cylinder during that exhaust stroke.

18 Claims, 7 Drawing Sheets

U.S. PATENT DOCUMENTS

| | | | | |
|---|---|---|---|---|
| 6,571,776 | B1 | 6/2003 | Dunsworth | |
| 6,758,177 | B1 * | 7/2004 | McKay et al. | 123/90.15 |
| 6,889,663 | B1 * | 5/2005 | Dunsworth et al. | 123/491 |
| 2005/0241613 | A1 * | 11/2005 | Weber et al. | 123/316 |

FOREIGN PATENT DOCUMENTS

| | | | |
|---|---|---|---|
| EP | 0990787 | A2 | 4/2000 |
| WO | WO 01/79679 | A1 | 10/2001 |

* cited by examiner

CAM SENSOR ELIMINATION IN COMPRESSION-IGNITION ENGINES

This application claims priority to and is a continuation of U.S. Ser. No. 10/615,439 filed Jul. 8, 2003 now U. S. Pat. No. 6,889,663, which is incorporated herein by reference in its entirety.

BACKGROUND OF THE INVENTION

The invention relates generally to control of compression-ignition engines, and more particularly to cam sensor elimination in four stroke compression-ignition engines having cylinders with large displacement volumes, such as locomotive or marine type engines.

Although various techniques for eliminating cam sensors have been provided in the context of relatively small spark-ignition engines, these type of techniques are believed not to be suited to the unique designs of larger compression-ignition engines, such as diesel engines. For example, the single cylinder displacement for a large sixteen cylinder locomotive diesel engine may be on the order of 11 liters whereas the single cylinder displacement for a typical diesel truck may be on the order of only 2 liters per cylinder. Therefore a single cylinder for a large locomotive engine may easily be more than five times larger than that of a large diesel truck. In addition, a typical truck engine has 6 or 8 cylinders as opposed to 12 or 16 for a typical locomotive engine, thus each cylinder contributes a smaller portion of the total power. This generally translates into very different design constraints since high injection pressure levels (on the order of 10–20 k.p.s.i.) are required in conjunction with much higher volume fuel flow rate ranges (100–1600 $mm^3$/stroke) to effectuate proper combustion in the larger l Other differences also impact the type of fuel injection system which may be employed on larger compression ignition engines. For example, locomotive engines are typically designed to maintain governor stability e.g., provide a relatively constant speed output to provide a steady power generating source for large fraction motors used to propel the wheels. Also, large locomotive engines encounter radical load changes due to switching of large auxiliary loads such as compressor loads, fan loads, and "hotel" power loads (an alternator for generating 110 V at 60 Hz) for passenger train applications. Driving such loads or turning off such loads can result in load changes on the order of 500 horsepower at any instant.

Another design consideration generally unique to such larger engines is lower engine speeds (RPM) and reduced chamber air movement. Smaller engines typically operate at engine speeds of several thousand RPM's. However, larger locomotive engines typically operate at between 0–1050 RPM. The rate at which the pistons move generally impacts the air intake speed and/or swirl. Lower RPM typically translates into slower air intake. With smaller volume cylinders, sufficient chamber air movement to allow proper atomization of the fuel to air mixture typically occurs during the power stroke. However, larger cylinders typically have much less cylinder air movement which results in a more stagnant trapped air volume. This generally requires a greater fuel injection pressure to be applied to overcome the in-cylinder compression and penetrate the trapped air volume in a sufficiently atomized state, such that entrainment will result in a homogenous and stoichiometric burn of the air/fuel mixture.

In a conventional locomotive engine design, a crank sensor synchronizes an engine governor unit (EGU) to the crank. A cam sensor, however, determines the respective stroke the engine is actually in, that is, without the cam sensor, the EGU would not be able to determine the difference between a compression stroke and an exhaust stroke. Once the cam position is known, the EGU does not typically need additional cam data because by sensing crank teeth information, the EGU is able to maintain the proper cam sense. Presently, one simply cannot start the locomotive engine without the cam sensor.

In view of the above-discussed issues, it would be desirable to provide control techniques that would allow for reliably providing controlled start of the compression-ignition engine of the locomotive even in the absence of the cam sensor since, presently, the cam sensor is a single point failure in the locomotive. Another reliability enhancement resulting from the elimination of the cam sensor would be to eliminate loss of synchronization in the EGU due to noisy cam pulses. It would be further desirable to lower manufacturing costs of the engine since if one could eliminate the cam sensor, one could also eliminate machining done on the cam sensor cover and timing wheel. Further, wiring and circuitry on the EGU that processes the cam sensor signal could be eliminated. Additionally, elimination of the cam sensor would result in a simpler manufacturing process not requiring time consuming and error prone cam sensor gapping actions.

BRIEF SUMMARY OF THE INVENTION

Generally, the present invention fulfills the foregoing needs by providing in one exemplary embodiment a method for controlling start of a compression ignition engine having a plurality of cylinders. Each cylinder includes a respective piston reciprocally movable between respective top and bottom positions along a cylinder longitudinal axis. The method comprises providing a respective fuel delivery assembly for each cylinder. The method further comprises retrieving from memory a set of fuel delivery assembly firing rules and then processing the firing rules so that a firing signal is delivered to each fuel delivery assembly on every crank revolution during a cranking mode of operation. The fuel delivery assembly is arranged to be responsive to any firing signal received during an injection window leading to the top position along the longitudinal axis so as to supply fuel to each cylinder during that injection window. The fuel delivery assembly is further arranged to be insensitive to any firing signal received outside the injection window so that no fuel is delivered to each cylinder outside the injection window.

The present invention further fulfills the foregoing needs by providing in another embodiment a method for controlling start of a compression ignition engine having a plurality of cylinders. Each cylinder includes a respective piston reciprocally movable between respective top and bottom positions along a cylinder longitudinal axis. The method comprises allows for providing a respective fuel delivery assembly for each cylinder. The method further allows for retrieving from memory a set of fuel delivery assembly firing rules. The firing rules are processed so that a firing signal is delivered to each fuel delivery assembly on every other crank revolution relative to an assumed cam position. Reprocessing the firing rules every n engine revolutions so that the firing signal is delivered to each fuel delivery assembly relative to a cam position about 180 degrees relative to the original assumed cam position, n corresponds to a positive integer greater than 1.

The present invention further fulfills the foregoing needs by providing in yet another embodiment a method for controlling start of a compression ignition engine having a plurality of cylinders grouped in at least two sets of cylinders. Each cylinder including a respective piston reciprocally movable between respective top and bottom positions along a cylinder longitudinal axis. The method allows for providing a respective fuel delivery assembly for each cylinder. The method further allows for retrieving from memory a set of fuel delivery assembly firing rules. The method further allows for processing the firing rules so that a firing signal is delivered to each fuel delivery assembly in one of the two sets of cylinders on every other crank revolution relative to an assumed cam position and for processing the firing rules so that a signal is delivered to each fuel delivery assembly in the other of the two sets of cylinders on every other crank revolution relative to a cam position about 180 degrees relative to the assumed cam position.

Figure 2:
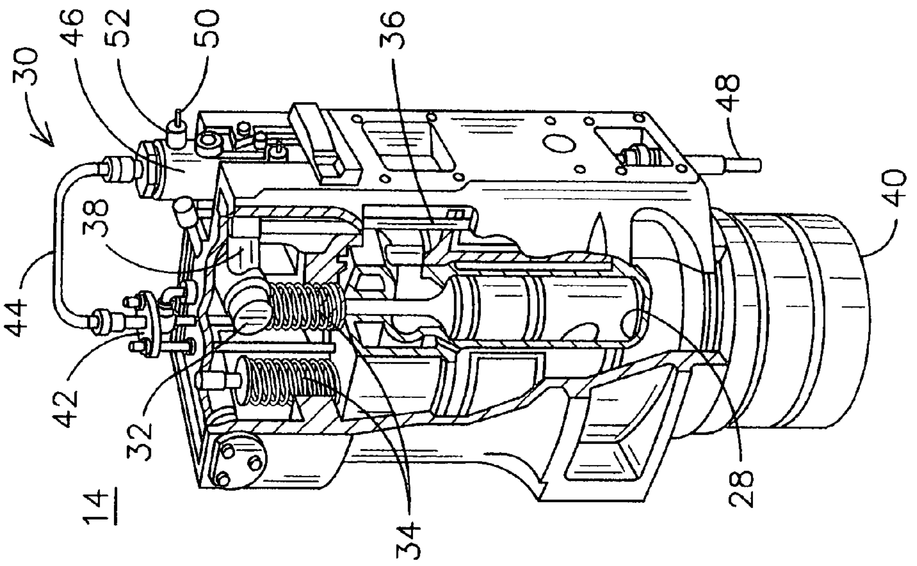
FIG. 2 is a partial cut-away view of a unitized power assembly controlled by a processor embodying the control algorithms illustrated below in the context of FIGS. 3–5.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Figure 1:
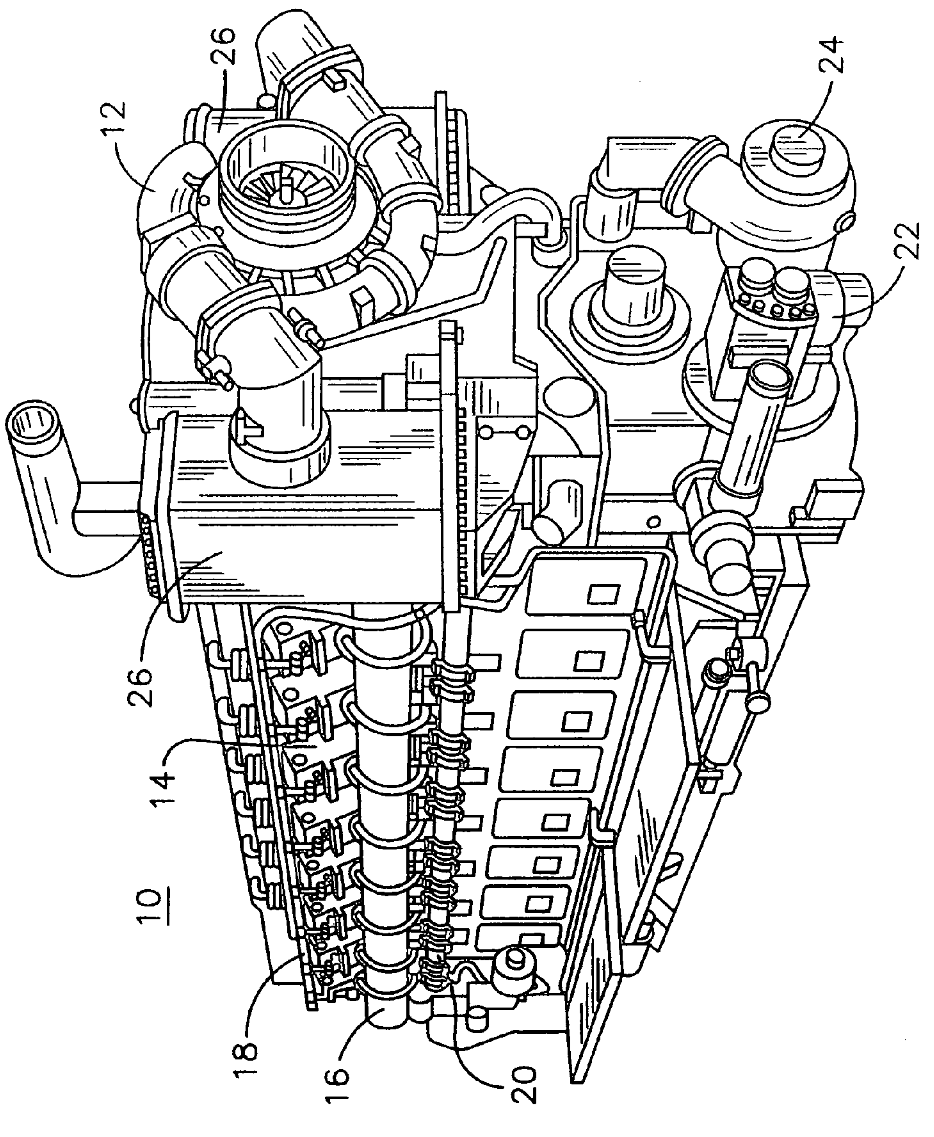
FIG. 1 is a perspective view of an exemplary Vee-style diesel locomotive engine that may benefit from the cam-elimination techniques of the present invention.

FIG. 1 generally depicts an exemplary compression ignition diesel engine 10 which employs an electronic fuel control system in accordance with one embodiment of the invention. The engine 10 may be any relatively large diesel engine, such as diesel engine models FDL-12, FDL-16, or HDL, as manufactured by General Electric Company, at Grove City, Pa. Such an engine may include a turbo charger 12 and a series of unitized power or fuel injection assemblies 14. For example, a 12-cylinder engine has 12 such power assemblies while a 16 cylinder engine has 16 such power assemblies. The engine 10 further includes an air intake manifold 16, a fuel supply line 18 for supplying fuel to each of the power assemblies 14, a water inlet manifold 20 used in cooling the engine, a lube oil pump 22 and a water pump 24, all as known in the art. An intercooler 26 connected to the turbo charger 12 facilitates cooling of the turbo charged air before it enters a respective combustion chamber inside one of the power assemblies 14. The engine may be a Vee-style type or an in line type, also as known in the art.

FIG. 2 depicts one of the plurality of power assemblies 14 which includes a cylinder 28 and a corresponding fuel delivery assembly generally indicated at 30 for delivering fuel to the combustion chamber within the cylinder 28. Each unitized power assembly 14 may further include an air valve rocker arm shaft 32 for moving a plurality of spring-biased air valves generally indicated at 34. The valve rocker arm shaft 32 is connected to the valve pushrod 36 through the valve rocker arm 38. The air valve rocker arm shaft 32 is connected to a valve pushrod 36 and is actuated as known in the art.

Each unitized power assembly 14 further includes a cylinder liner 40 which is insertable into a bored aperture (not shown) in the engine block of the engine 10. The unitized power assembly 14 includes a cylinder jacket or casting for housing the cylinder 28 and associated components. For a typical engine 10, such as may be used in locomotive applications, an exemplary range of injection pressure is between approximately 15–20 k.p.s.i. An exemplary fuel delivery flow volume range is between about 100–1600 $mm^3$/stroke. An exemplary range of per cylinder displacement may be from about 5.5 liters to about 11 liters. It will be appreciated that the present invention is not limited to the above-described exemplary ranges.

The fuel delivery assembly 30 includes a fuel injecting mechanism 42 connected to a high-pressure injection line 44 which fluidly connects to a fuel pressure generating unit 46 such as a fuel pump. This configuration is known as a pump-line-nozzle configuration. The fuel pressure generating unit 46 builds pressure through the actuation of fuel pushrod 48 which is actuated by a lobe on the engine camshaft dedicated to fuel delivery actuation. The fuel delivery assembly 30 includes an electronic signal line 50 for receiving electronic signals from an electronic controller, as will be described later. The electronic signal line 50 provides a control signal to an electronically-controlled valve 52 which forms part of the fuel delivery assembly 30.

The unitized power assembly 14 derives its name from the fact that each cylinder and accompanying components (or power assembly) may be removed from the engine individually to facilitate servicing. Consequently, the entire engine need not be removed or replaced to facilitate repair of the cylinder or any of its associated components. It will be appreciated that the system and techniques of the present invention are not limited to unitized power assemblies.

Figure 3A:
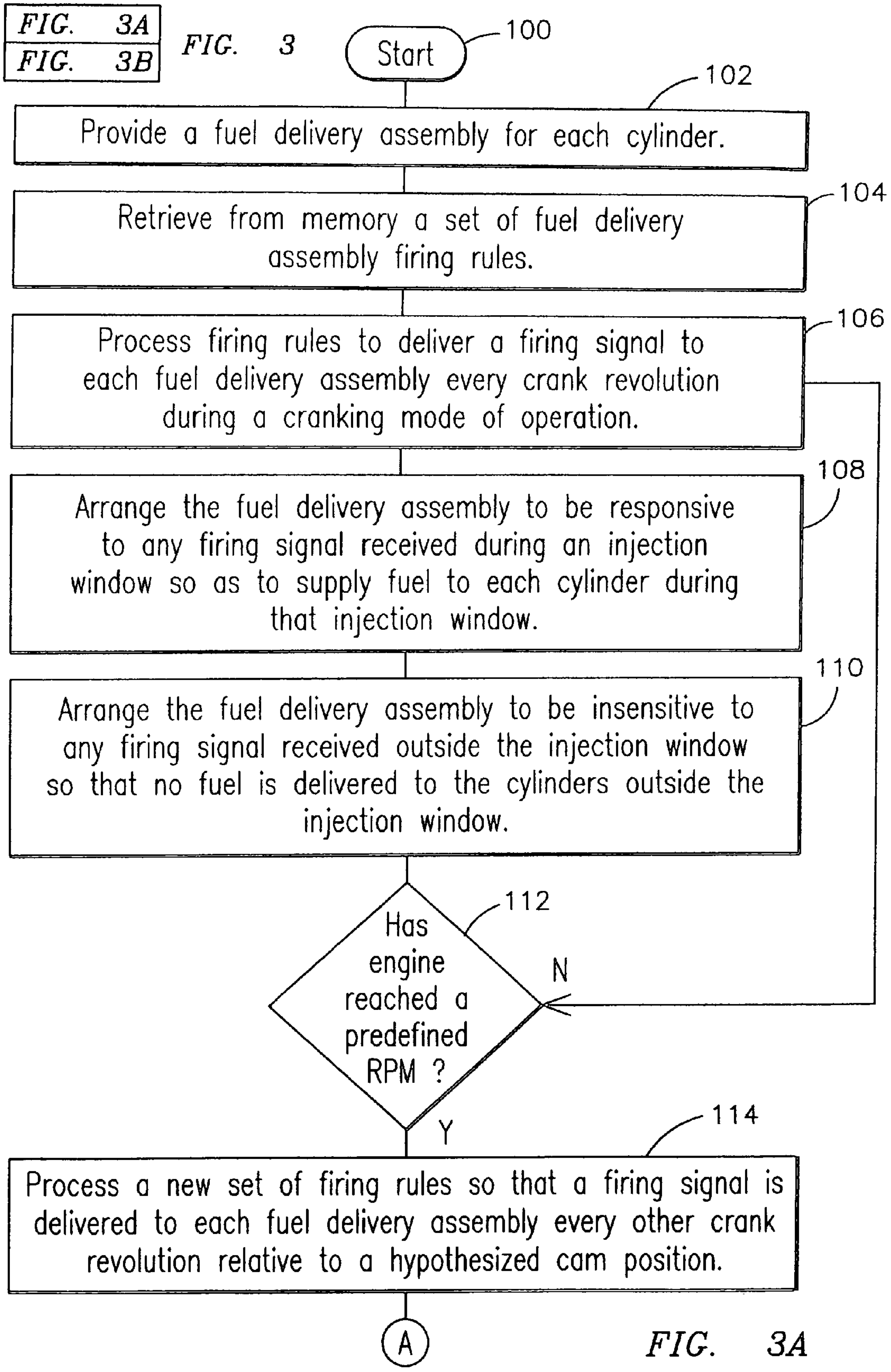
FIG. 3 is a flow chart of an exemplary embodiment for controlling start of a compression ignition engine having a plurality of cylinders without use of a cam sensor.
Figure 3B:
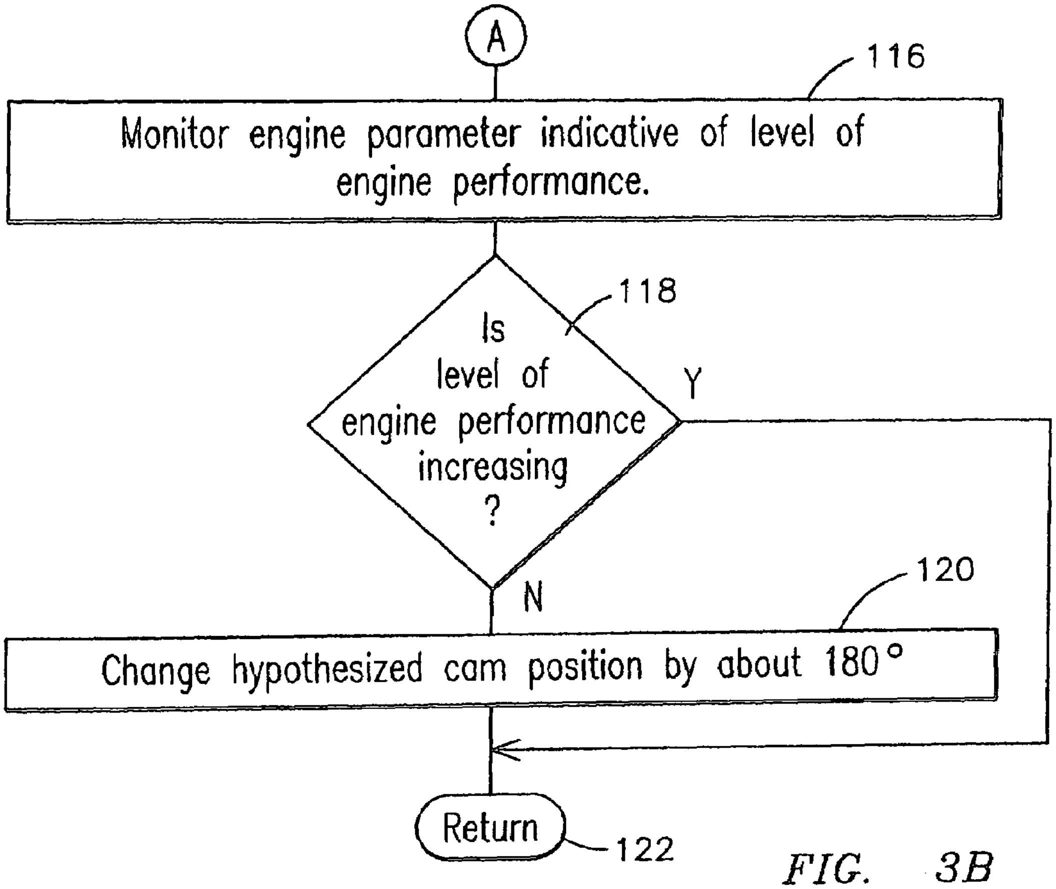

FIG. 3 illustrates a flow chart of an exemplary method embodying one aspect of the present invention. The method allows for controlling start of a compression ignition engine having a plurality of cylinders without use of a cam sensor. Each cylinder includes a respective piston reciprocally movable between respective top and bottom positions, e.g., top dead center (TDC) and bottom dead center (BDC), along a cylinder longitudinal axis. As discussed above, subsequent to start step 100, step 102 allows for providing a fuel delivery assembly, e.g., fuel delivery assembly 30 (FIG. 2) for each cylinder. Step 104 allows for retrieving from memory a set of fuel delivery assembly firing rules. Step 106 allows for processing the retrieved firing rules to deliver a firing signal to each fuel delivery assembly per every crank revolution during a cranking mode of operation. It will be appreciated by those skilled in the art that standard engine starting techniques that rely on cam sensor information would generally delivery a firing signal during every other crank revolution during the cranking mode of operation in lieu of delivering the firing signal per every cranking revolution. Step 108 allows for arranging the fuel delivery assembly to be responsive to any firing signal received during a compression stroke at TDC so as to supply fuel to each cylinder during an injection window, which is determined by the rise of the fuel cam lobe. For example, if the cam lobe profile is rising, then fuel pushrod 48 (FIG. 1) will be actuated and, in cooperation with the firing signal that actuates the solenoid that opens the high pressure line, then delivery of fuel into the cylinder will occur. It will be appreciated that fuel delivery within that injection window is not limited to fuel delivery just within the compression stroke, since the delivery usually continues into the power stroke. For instance, we may start injection at 5 degrees before TDC and continue for 25 degrees after TDC. Step 110 allows for arranging the fuel delivery assembly to be insensitive to any firing signal received outside the injection window so that no fuel is delivered to the cylinder outside the injection window. For example, if the cam lobe profile is no longer rising, then fuel pushrod 48 (FIG. 1) will not be actuated to deliver any fuel and, even the presence of the firing signal would not result in delivery of fuel into the cylinder since the fuel pushrod in this case would not have been actuated by the fuel cam lobe. Thus, this embodiment takes advantage of the above-described dual interrelationship for delivering fuel into the cylinders: 1) fuel pushrod actuation and 2) presence of firing signal. If either of the two actions do not occur, then fuel delivery does not occur. It will be appreciated that foregoing interrelationship comprises an electromechanical interrelationship built in one exemplary embodiment and need not be implemented via software code.

The above-described actions allow during the cranking mode of operation to fire one or more solenoids in the fuel delivery assembly as if each cylinder TDC corresponds to the compression stroke. This results in firing the cylinder if indeed the cylinder is at TDC of the compression stroke, however, the fuel delivery assembly will not inject fuel if the cylinder is at TDC of the exhaust stroke since in this latter case a fuel pump cam would not be moving upwardly, and thus no fuel flow will develop and the cylinder would not be fired even in the presence of a firing signal. This embodiment enables to start the engine with all cylinders and could be continued indefinitely. In the event that there may be a concern regarding incremental wear on the injector pump valve if it is receiving a firing signal every crank revolution, then the following optional steps may be used to synchronize the engine. It will be appreciated, however, that if incremental wear of the injector valve is not a factor, then the following steps are not necessary.

Step 112 allows for determining whether the engine has reached a predefined engine condition, such as engine RPM ranging from about 200 to about 250 RPM. If the engine has reached the predefined engine RPM, then step 114 allows for processing a new set of firing rules so that a firing signal is delivered to each fuel delivery assembly during every other crank revolution relative to an assumed cam position. If the engine has not reached the predefined engine speed, then the method iteratively continues at step 106. Step 116, reached through connecting node A, allows for monitoring one or more operational engine parameters indicative of the level of performance of the engine, e.g., engine speed, acceleration, etc. As indicated at decision block 118, if the level of engine performance decreases, then step 120 allows for changing the assumed cam position by about 180 degrees, prior to return step 122. Conversely, if the level of engine performance increases, then the method proceeds to return to step 122. This would indicate that the assumed cam position corresponds to the actual cam position. Further engine synchronization would be maintained by sensing a signal indicative of crank teeth position, as would be readily understood by one of ordinary skill in the art.

Figure 4A:
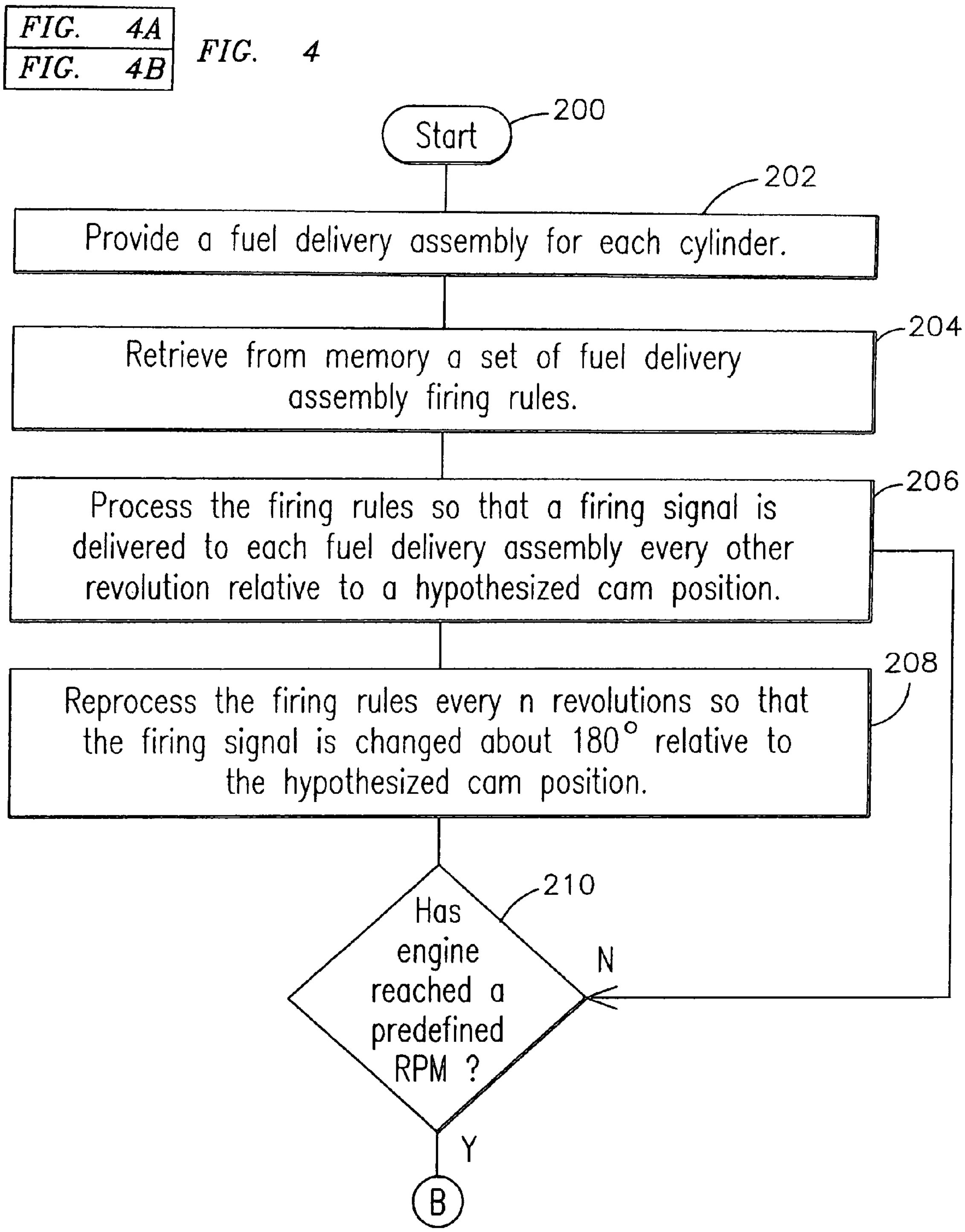
FIG. 4 is a flow chart of another exemplary embodiment for controlling start of a compression ignition engine without use of a cam sensor.
Figure 4B:
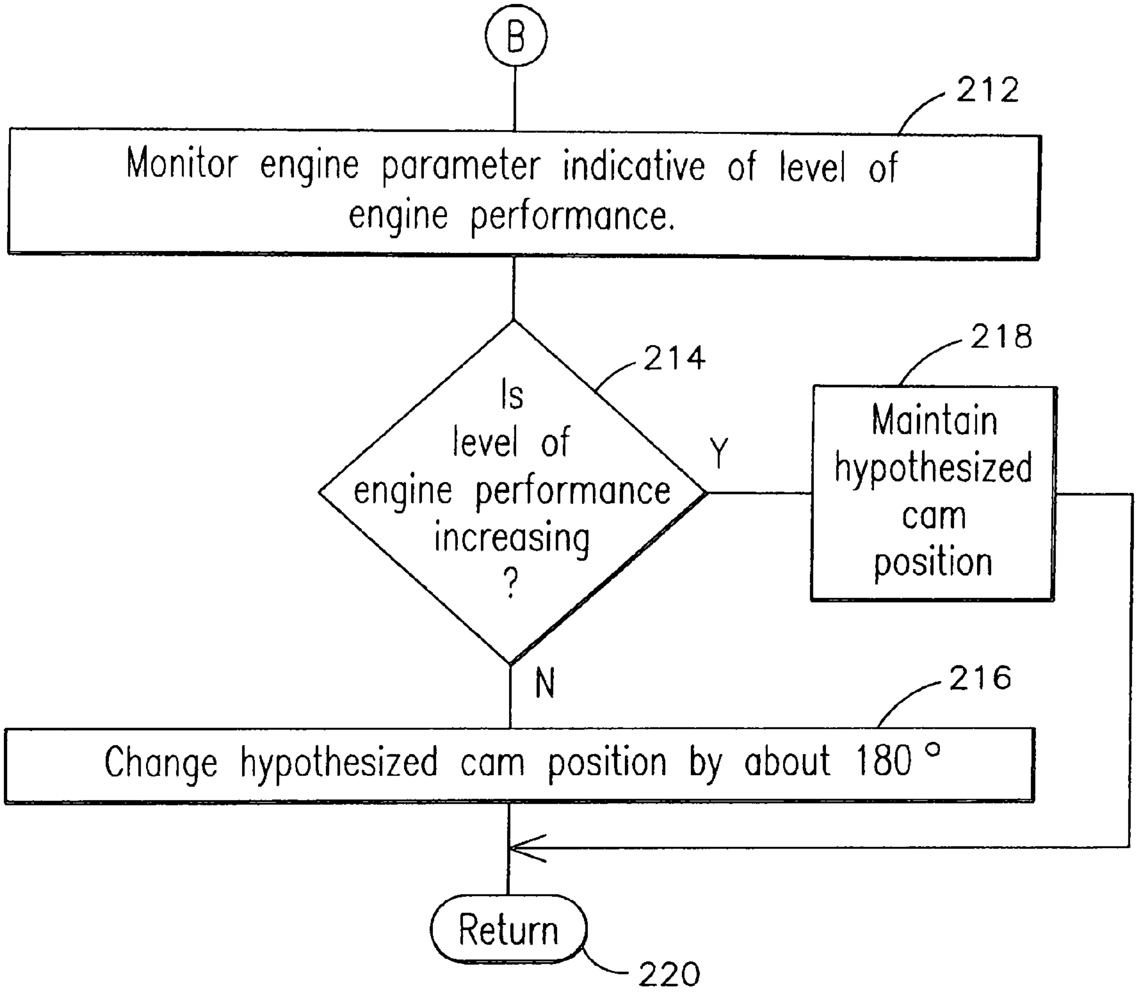

FIG. 4 illustrates a flow chart of an exemplary method embodying another aspect of the present invention. The method allows for controlling start of a compression ignition engine having a plurality of cylinders without use of a cam sensor. Each cylinder includes a respective piston reciprocally movable between respective top and bottom positions, e.g., top dead center (TDC) and bottom dead center (BDC), along a cylinder longitudinal axis. As discussed above, subsequent to start step 200, step 202 allows for providing a fuel delivery assembly, e.g., fuel delivery assembly 30 (FIG. 2) for each cylinder. Step 204 allows for retrieving from memory a set of fuel delivery assembly firing rules. Step 206 allows for processing the retrieved firing rules to deliver a firing signal to each fuel delivery assembly on every other crank revolution relative to an assumed cam position. Step 208 allows for reprocessing the firing rules every n revolutions so that the timing of the firing signal is changed about 180 degrees relative to the assumed cam position.

Step 210 allows for determining whether the engine has reached a predefined engine condition, such as engine RPM ranging from about 200 to about 250 RPM. If the engine has reached the predefined engine RPM, then the method continues at step 212 reached through connecting node B. If the engine has not reached the predefined engine speed, then the method iteratively continues at step 206. Step 212 allows for monitoring one or more operational engine parameters indicative of the level of performance of the engine, e.g., engine speed, acceleration, etc. As indicated at decision block 214, if the level of engine performance decreases, then step 216 allows for changing the assumed cam position by about 180 degrees, prior to return step 220. Conversely, if the level of engine performance increases, then the method proceeds to return step 220.

As suggested above, this last-described embodiment will attempt to fire the engine correctly for n revolutions, then fire incorrectly for n revolutions and could give the operator the impression that the engine is not running properly. It is believed that appropriate training of the operator would avoid that issue. In addition, n should be chosen to allow enough time for the engine to accelerate to the decision speed. Also, the decision speed must be far enough above the cranking speed to assure that the engine has in fact reached this speed by its own power.

In one exemplary implementation n may be equal to one. That is, one would assume a cam position (e.g., either corresponding to a compression stroke or to an exhaust stroke) and would attempt firing the engine based on the assumed position. If the engine does not start, one would change the assumption to the other position and would attempt firing the engine based on this other position. It is contemplated to make use of sensors commonly available in locomotive engines indicative of the probability of correctly making an appropriate firing cycle the first time. That is, to increase the probability that the assumed cam position corresponds to the actual condition of the engine, e.g., whether in a compression stroke or in an exhaust stroke. For example, one could use a manifold pressure sensor to sense manifold pressure characteristic during cranking that would indicate which cycle the engine may be on. It will be appreciated that any other sensor suitable for measuring characteristics indicative of the probability of being in a compression stroke or in an exhaust stroke could be used equally effectively. Another technique that may be used for improving the probability of correctly making an appropriate firing cycle the first time may be for the controller to remember the last firing cycle based on the engine position when it was last running, as may be sensed by an engine position sensor. In practice, this technique may be somewhat difficult to implement since the resolution of typical engine position sensors tends to decrease as the engine coasts to a stop.

Figure 5:
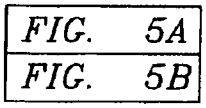
FIG. 5 is a flow chart of yet another exemplary embodiment for controlling start of a compression ignition engine having a plurality of cylinders without use of a cam sensor.
Figure 5A:
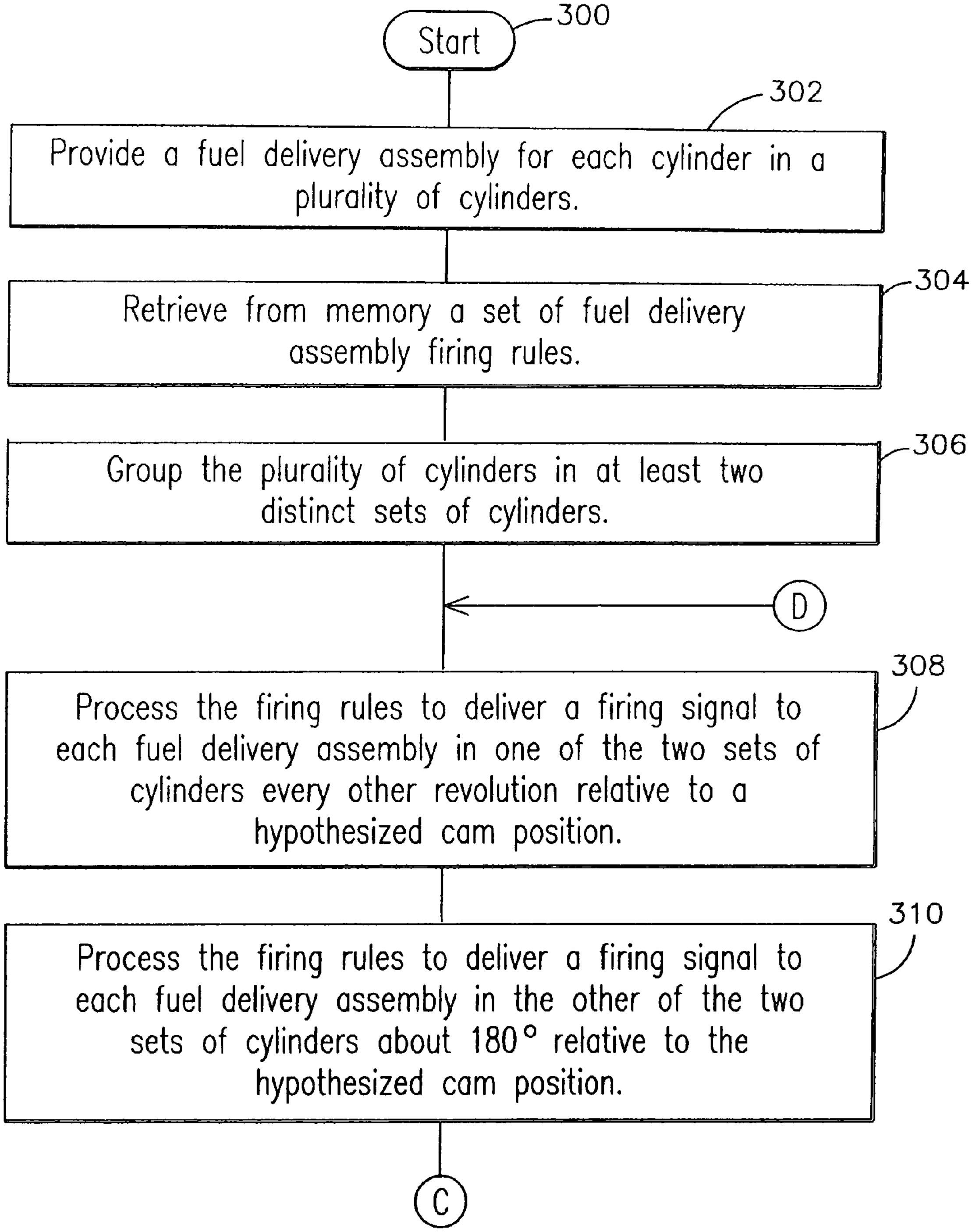
Figure 5B:
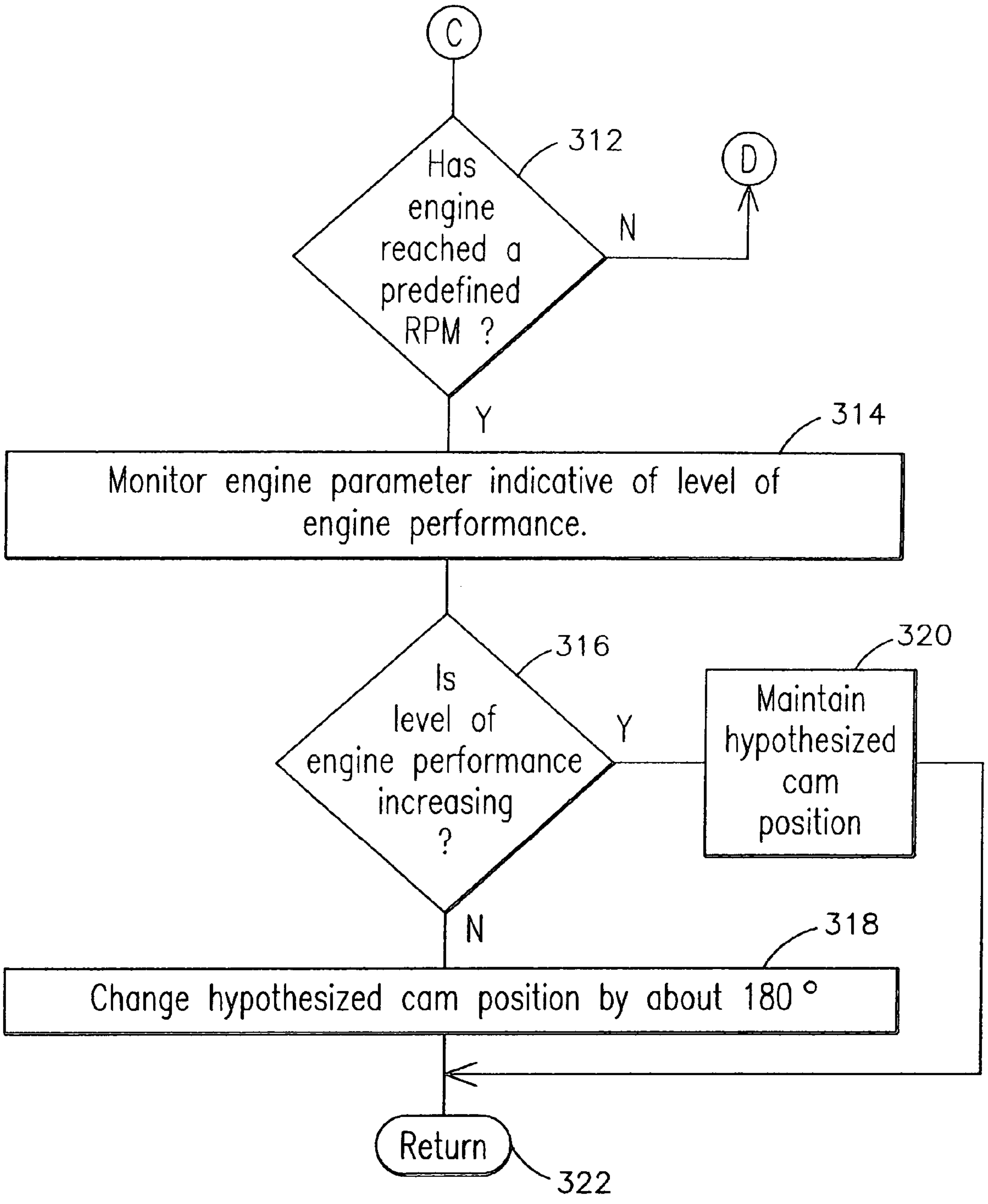

FIG. 5 illustrates a flow chart of an exemplary method embodying yet another aspect of the present invention. The method allows for controlling start of a compression ignition engine having a plurality of cylinders without use of a cam sensor. Each cylinder includes a respective piston reciprocally movable between respective top and bottom positions, e.g., top dead center (TDC) and bottom dead center (BDC), along a cylinder longitudinal axis. As discussed above, subsequent to start step 300, step 302 allows for providing a fuel delivery assembly for each cylinder. Step 304 allows for retrieving from memory a set of fuel delivery assembly firing rules. Step 306 allows for grouping the plurality of cylinders in at least two distinct sets of cylinders. For example, in a 16 cylinder engine made up of two banks of eight cylinders, then each cylinder in one bank would comprise one set of cylinders and each cylinder in the other bank would comprise the second set of cylinders. It will be appreciated that other grouping of sets are possible. For instance, the front 8 cylinders could be one set and the back 8 the other. All even cylinders could be in one set, the odd cylinders in the other. Step 308 allows for processing the retrieved firing rules to deliver a firing signal to each fuel delivery assembly in one of the two sets of cylinders on every other crank revolution relative to an assumed cam position. Step 310 allows for processing the retrieved firing rules to deliver a firing signal to each fuel delivery assembly in the other one of the two sets of cylinders on every other crank revolution about 180 degrees relative to the assumed cam position.

It will be appreciated that in this exemplary embodiment, half of the cylinders will receive a firing signal during the firing window and produce power. The other half of the cylinders will receive the signal during the exhaust/intake stroke and no fuel will be delivered.

Step 312, reached through connecting node C, allows for determining whether the engine has reached a predefined engine condition, such as engine RPM ranging from about 200 to about 250 RPM. If the engine has not reached the predefined engine speed, then the method iteratively continues at step 308 reached through connecting node D. If the engine has reached the predefined engine RPM, then step 314 allows for monitoring one or more operational engine parameters indicative of the level of performance of the engine, e.g., engine speed, acceleration, etc. As indicated at decision block 316, if the level of engine performance decreases, then step 318 allows for changing the assumed cam position by about 180 degrees, prior to return step 322. Conversely, if the level of engine performance increases, then step 320 allows for continuing to maintain the firing signal relative to the assumed cam position prior to return step 322. It is believed that this last-described technique, may offer some advantages in one exemplary embodiment since it does not require any wiring changes to an existing engine control design and it is further believed that this embodiment better handle dry-injector conditions.

Figure 6:
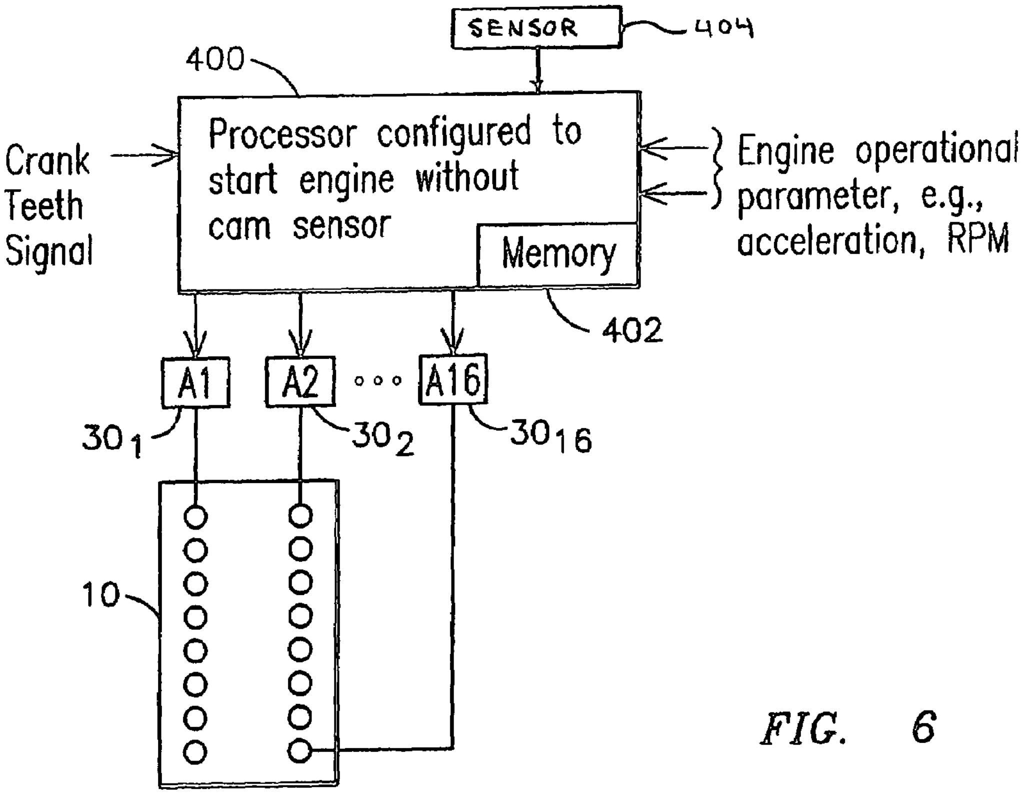
FIG. 6 is a simplified block diagram of a processor that may be used for controlling start of a compression ignition without use of a cam sensor.

FIG. 6 illustrates an exemplary processor 400 configured to start a large compression ignition engine without cam sensor information. Memory 402 is used for storing the various firing rules respectively delivered to each fuel delivery assembly 30, as discussed in the context of FIGS. 3 though 5. As suggested above, once a correct cam orientation has been determined, a crank teeth signal from a crank sensor together with signals indicative of various operational and/or environmental conditions, e.g., ambient temperature, barometric pressure, engine RPM, acceleration, etc., are used for determining any desired timing and fuel-value requirement for efficiently controlling engine operation in a manner well-understood by those of ordinary skill in the art. A sensor 404, such as a manifold pressure sensor, may be used for sensing an engine indication that may indicate the probability of making a correct assumption for the cam position the first time a firing signal is delivered. For example, manifold pressure may vary depending on whether the engine may be in a compression stroke or an exhaust stroke.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method for controlling start of a compression ignition engine without a cam sensor, the engine having a plurality of cylinders, each cylinder including a respective piston reciprocally movable between respective top and bottom positions along a cylinder longitudinal axis, the method comprising:

providing a respective fuel delivery assembly for each cylinder;

retrieving from memory a set of fuel delivery assembly firing rules;

processing the firing rules so that a firing signal is delivered to each fuel delivery assembly relative to an assumed cam position; and monitoring at least one engine operational parameter so that if engine operational performance increases, then the assumed cam position is maintained, and in the event engine operational performance decreases, then the assumed cam position is changed by about 180 degrees.

2. The method of claim 1 wherein the firing signal is delivered on every other crank revolution relative to the assumed cam position.

3. The method of claim 2 further comprising reprocessing the firing rules every n engine revolutions so that the firing signal is delivered to each fuel delivery assembly relative to a cam position about 180 degrees relative to the assumed cam position, n corresponding to a positive integer.

4. The method of claim 1 further comprising, in the event of an unsuccessful engine start, arranging the firing signal to be delivered to each fuel delivery assembly relative to a cam position about 180 degrees relative to the assumed cam position.

5. The method of claim 4 wherein the engine operational parameter is selected from the group consisting of engine speed, acceleration, engine output power.

6. The method of claim 1 further comprising sensing an engine indication indicative of the probability of making a correct assumption for the cam position the first time a firing signal is delivered.

7. The method of claim 6 wherein the sensed engine indication comprises manifold pressure.

8. The method of claim 1 wherein the assumed cam position is based on an engine position sensed when the engine was last running.

9. A method for controlling start of a compression ignition engine without a cam sensor, the engine having a plurality of cylinders grouped in at least two sets of cylinders, each cylinder including a respective piston reciprocally movable between respective top and bottom positions along a cylinder longitudinal axis, the method comprising:

providing a respective fuel delivery assembly for each cylinder;

retrieving from memory a set of fuel delivery assembly firing rules;

processing the firing rules so that a firing signal is delivered to each fuel delivery assembly in one of the two sets of cylinders on every other crank revolution relative to an assumed cam position; and processing the firing rules so that a signal is delivered to each fuel delivery assembly in the other of two sets of cylinders on every other crank revolution relative to a cam position about 180 degrees relative to the assumed cam position.

10. The method of claim 9 further comprising monitoring one or more engine operational parameters so that if engine operational performance increases, then the assumed cam position is maintained.

11. The method of claim 9 further comprising sensing one or more engine operational parameters so that if engine operational performance decreases, then the assumed cam position is changed by about 180 degrees.

12. A system for controlling start of a compression ignition engine without a cam sensor, the engine having a plurality of cylinders, each cylinder including a respective piston reciprocally movable between respective top and bottom positions along a cylinder longitudinal axis, the system comprising:

a respective fuel delivery assembly for each cylinder;

memory comprising a set of fuel delivery assembly firing rules;

a processor configured to process the firing rules so that a firing signal is delivered to each fuel delivery assembly relative to an assumed cam position; and at least one sensor for monitoring at least one engine operational parameter so that if engine operational performance increases, then the assumed cam position is maintained, and in the event engine operational performance decreases, then the assumed cam position is changed by about 180 degrees.

13. The system of claim 12 wherein the firing signal is delivered on every other crank revolution relative to the assumed cam position.

14. The system of claim 13 wherein the processor is further configured to reprocess the firing rules every n engine revolutions so that the firing signal is delivered to each fuel delivery assembly relative to a cam position about 180 degrees relative to the assumed cam position, n corresponding to a positive integer.

15. The system of claim 12 wherein, in the event of an unsuccessful engine start, the processor is configured to cause the firing signal to be delivered to each fuel delivery assembly relative to a cam position about 180 degrees relative to the assumed cam position.

16. The system of claim 12 further comprising a sensor for sensing an engine indication indicative of a probability of making a correct assumption for the cam position the first time a firing signal is delivered.

17. The system of claim 16 wherein the sensed engine indication comprises manifold pressure.

18. The system of claim 12 wherein the assumed cam position is based on an engine position sensed when the engine was last running.

* * * * *